US010534702B2

(12) United States Patent
Ikuno

(10) Patent No.: US 10,534,702 B2
(45) Date of Patent: Jan. 14, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takao Ikuno, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 15/277,757

(22) Filed: Sep. 27, 2016

(65) Prior Publication Data
US 2017/0097885 A1 Apr. 6, 2017

(30) Foreign Application Priority Data

Oct. 1, 2015 (JP) .................................. 2015-195835

(51) Int. Cl.
G06F 12/00 (2006.01)
G06F 13/00 (2006.01)
(Continued)

(52) U.S. Cl.
CPC ............ *G06F 12/0223* (2013.01); *G06F 8/61* (2013.01); *G06F 3/0631* (2013.01); *G06F 12/0284* (2013.01); *G06F 2212/172* (2013.01)

(58) Field of Classification Search
CPC . G06F 3/0631; G06F 12/0223; G06F 12/0284
(Continued)

(56) References Cited

U.S. PATENT DOCUMENTS 5,619,696 A 4/1997 Nakagawa
2003/0043638 A1* 3/2003 Chrisop ............. H04N 1/00352
358/1.16
(Continued)

FOREIGN PATENT DOCUMENTS

CN 1116640 C 7/2003
CN 102014159 A 4/2011
(Continued)

OTHER PUBLICATIONS

Benny Wang-Leung Cheung, et al., LOTS: A Software DSM Supporting Large Object Space, IEEE International Conference on Cluster Computing, 2004, pp. 225-234.

*Primary Examiner* — Edward J Dudek, Jr.
*Assistant Examiner* — Sidney Li
(74) *Attorney, Agent, or Firm* — Canon U.S.A., Inc. IP Division

(57) ABSTRACT

An information processing method to be executed by a processor executing instructions in a memory, the information processing method includes allocating, in a first area of the storage area, an area having a predetermined size to an application, determining whether an processing area to be used when processing of the application is executed in the first area, and upon condition that it is determined that the processing is able to be reserved in the first area, reserving the processing area in the first area as the allocated area having the predetermined size to an application, and upon condition that it is determined that the processing area is not able to be reserved in the first area, trying to reserve the processing area in a second area in the storage area, and performing notification upon condition that the processing is not able to be reserved in the second area.

7 Claims, 7 Drawing Sheets

(51) Int. Cl.
*G06F 13/28* (2006.01)
*G06F 12/02* (2006.01)
*G06F 8/61* (2018.01)
*G06F 3/06* (2006.01)

(58) Field of Classification Search
USPC .......................................................... 711/170
See application file for complete search history.

(56) References Cited

U.S. PATENT DOCUMENTS

| | | | |
|---|---|---|---|
| 2003/0149847 A1* | 8/2003 | Shyam | G06F 3/0601 |
| | | | 711/154 |
| 2008/0005388 A1 | 1/2008 | Hara | |
| 2010/0034551 A1* | 2/2010 | Okamura | G03G 15/50 |
| | | | 399/83 |
| 2011/0296132 A1* | 12/2011 | Li | G06F 12/0253 |
| | | | 711/166 |
| 2012/0233624 A1 | 9/2012 | Niimura | |
| 2014/0123236 A1 | 5/2014 | Hirata | |

FOREIGN PATENT DOCUMENTS

| | | |
|---|---|---|
| CN | 103946818 A | 7/2014 |
| EP | 1164476 A2 | 12/2001 |
| EP | 2778918 A2 | 9/2014 |
| JP | S63123143 A | 5/1988 |
| JP | 2004164076 A | 6/2004 |
| JP | 2014085945 A | 5/2014 |
| WO | 2006/033226 A1 | 3/2006 |

* cited by examiner

FIG. 6B

USER REGISTRATION

| USER NAME | O×△× |
|---|---|
| PASSWORD | ********** |
| DEPARTMENT | XYZ DEPARTMENT |
| GROUP NAME | GROUP 1 |
| MAIL ADDRESS | aaa@aaa.jp |
| OPERATOR | NO |

USER REGISTRATION

FIG. 6C

LOGIN MANAGER

SINCE MEMORY IS FULL, NEW USER CANNOT BE REGISTERED.

OK

INFORMATION PROCESSING APPARATUS, INFORMATION PROCESSING METHOD, AND STORAGE MEDIUM

BACKGROUND OF THE INVENTION

Field of the Invention

The one of the aspects of present invention relates to an information processing apparatus, an information processing method, and a storage medium.

Description of the Related Art

There is an information processing apparatus in which a program (an application program) different from an embedded program is installed to allow the information processing apparatus to provide various services.

In such an information processing apparatus, a plurality of application programs can be installed and operated. In the installation and operation, each application uses a storage area provided in the information processing apparatus.

In some instances, the plurality of applications is simultaneously operated. Thus, the storage area of the information processing apparatus needs to be appropriately allocated to each application in order for the applications to operate appropriately.

United States Patent Publication Application No. 2012/0233624 discusses a method for managing a storage area. In the method, in a case where usage of the storage area by one of applications in operation is equal to or more than a certain size, the application is appropriately stopped.

Further, there is also a quota system management method. When a plurality of applications simultaneously uses one storage device, a maximum memory size that can be used by each of the applications is determined in advance. Hence, each of the application is managed such that the determined maximum memory size or more of the storage device cannot be used.

SUMMARY OF THE INVENTION

According to an aspect of the present invention, an information processing method to be executed by a processor executing instructions in a memory, the information processing method includes allocating, in a first area of the storage area, an area having a predetermined size to an application, determining whether an processing area to be used when processing of the application is executed in the first area allocated to the application in the storage area, and upon condition that it is determined that the processing is able to be reserved in the first area, reserving the processing area in the first area as the allocated area having the predetermined size to an application, and upon condition that it is determined that the processing area is not able to be reserved in the first area, trying to reserve the processing area in a second area in the storage area, and performing notification upon condition that the processing is not able to be reserved in the second area.

Further features of the present invention will become apparent from the following description of exemplary embodiments with reference to the attached drawings.

BRIEF DESCRIPTION OF THE DRAWINGS

FIGS. 6A, 6B, and 6C are diagrams each illustrating an example of a screen display of an operation unit.

DESCRIPTION OF THE EMBODIMENTS

Hereinafter, exemplary embodiment of the present invention are described with reference to the drawings.

In general, devices such as personal computers and smart phones are taken as examples of an information processing apparatus. The recent trend however is that, even in an information processing apparatus, e.g., a copier, having a smaller storage area than those devices, an application is installed for providing services.

Even in a case where a plurality of applications is installed in and operated by such an information processing apparatus having a smaller storage area, a simultaneous operation of the plurality of applications is needed.

In a case where the plurality of applications is simultaneously operated, the operation of the plurality of applications cannot be stopped even if there is no more storage area necessary to operate the plurality of applications. Moreover, in a case of the information processing apparatus having a small storage area, if a maximum storage area necessary for each application is reserved beforehand, the storage area may become insufficient. Thus, each of the following exemplary embodiments is provided so that a storage area can be appropriately managed by a management method, such as a quota system.

Figure 1:
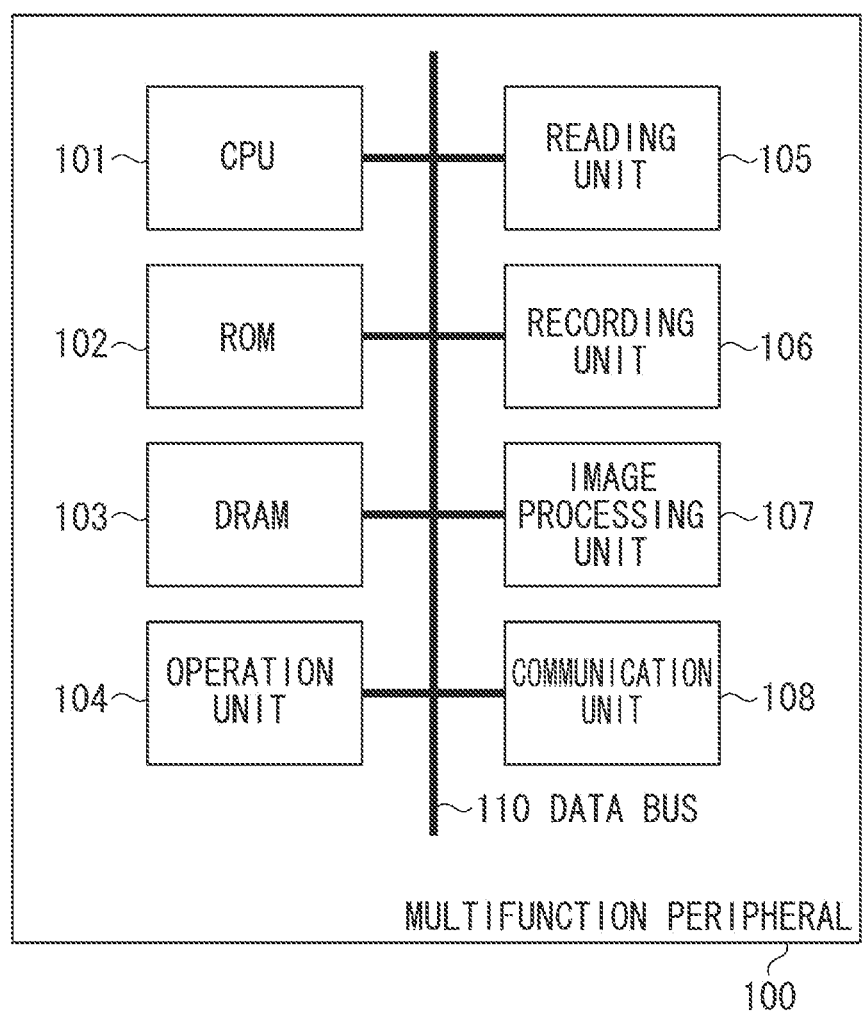
FIG. 1 is a diagram illustrating an example of a hardware configuration of a multifunction peripheral.

Hereinafter, a multifunction peripheral 100 is described as an example the information processing apparatus. FIG. 1 illustrates an example of the multifunction peripheral 100.

The multifunction peripheral 100 includes a central processing unit (CPU) 101 that is a system control unit. The CPU 101 comprehensively controls the multifunction peripheral 100. A read only memory (ROM) 102 includes a flash memory, such as an embedded multimedia card (eMMC) to store a control program to be executed by the CPU 101. Moreover, the ROM 102 stores image data and a setting value that should not be deleted when a power supply is turned off. In addition, the ROM 102 stores application program data. The ROM 102 according to the present exemplary embodiment has a capacity that is considerably smaller than that of a memory provided in a device, such as a personal computer. A dynamic random access memory (DRAM) 103 stores a program control variable, for example. Moreover, the DRAM 103 serves as a volatile memory capable of temporarily storing image data to be processed. An operation unit 104 is an interface unit for displaying information about the multifunction peripheral 100 for a user. A reading unit 105 reads image data and converts the read image data into binary data. The multifunction peripheral 100 uses the reading unit 105 to perform document reading of an image transmission function. A recording unit 106 outputs the image data to a recording sheet. An image processing unit 107 encodes and decodes the image data to be dealt with by the image transmission function. A communication unit 108 is an interface unit between the multifunction peripheral 100 and an external communication network. The communication unit 108 includes a network communication unit serving as an interface to a network. These units are connected one another via a data bus 110.

When the CPU 101 executes processing based on a program stored in a memory, such as the ROM 102, a function of the multifunction peripheral 100 is realized and processing of a flowchart is performed. The function and the flowchart will be described below. For example, when the CPU 101 executes processing based on installation data corresponding to an application program stored in a memory, such as the ROM 102, a function of the application is realized.

In the multifunction peripheral 100, a loadable program different from a main program that is operated in an apparatus main body is installed and executed. An example of such a case is described below.

Figure 2:
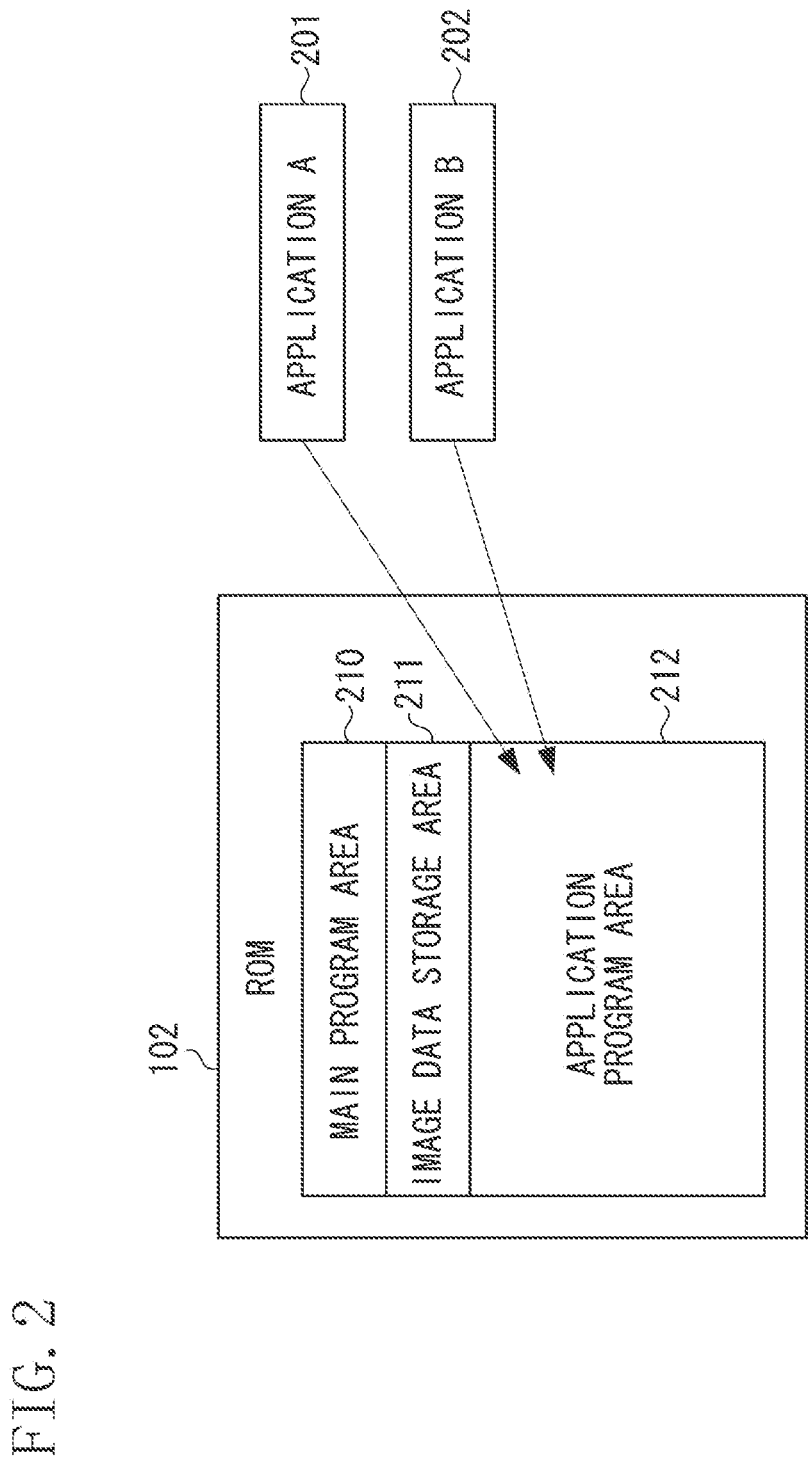
FIG. 2 is a diagram illustrating an example case in which an application program is installed in a read only memory (ROM).

FIG. 2 is a diagram illustrating an example case in which an application program is installed in the ROM 102 of the multifunction peripheral 100.

The ROM 102 of the eMMC includes a plurality of areas, such as a main program area 210, an image data storage area 211, and an application program area 212 according to the purpose for which each area is used. The main program area 210 is for an operation of the apparatus body of the multifunction peripheral 100. The image data storage area 211 stores a received image. The application program area 212 is set for an operation of an application program. Consider a case where an application A 201 and an application B 202 are installed in the application program area 212 and then operated.

For example, the application program area 212 has a size of 100 megabytes (MBytes).

Further, the application A 201 is a login application (an application body has a data size of 1 MByte) in which login data (500 kilobytes (KBytes) per login data) for a maximum of 100 people can be recorded.

The application B 202 is a form print application (an application body has a data size of 2 MBytes), and can register and print a form (maximum image data is 3 MBytes per sheet). The application B 202 can register forms up to 100 sheets.

According to upper limit management by the quota system, a maximum upper limit permission usage for each application is determined based on a maximum storage size to be used by each application program.

As for the application A 201, since a storage is used up to a maximum of 51 MBytes based on 1 MByte of the body+0.5 MByte×100 records=51 MBytes, a maximum upper limit permission usage is 51 MBytes.

As for the application B 202, since a storage is used up to a maximum of 302 MBytes based on 2 MBytes of the body+3 MBytes×100 cases=302 MBytes, a maximum upper limit permission usage is 302 MBytes.

In such a case, the application A 201 can be installed in the application program area 212 having a size of 100 MBytes, whereas the application B 202 cannot be installed.

In such an application operation environment in which the application program area 212 is small, the processing according to the present exemplary embodiment efficiently allocates storage to a plurality of applications to provide an environment in which each of the applications can be appropriately operated.

Thus, the multifunction peripheral 100 divides the application program area 212 and manages the divided areas.

Figure 3:
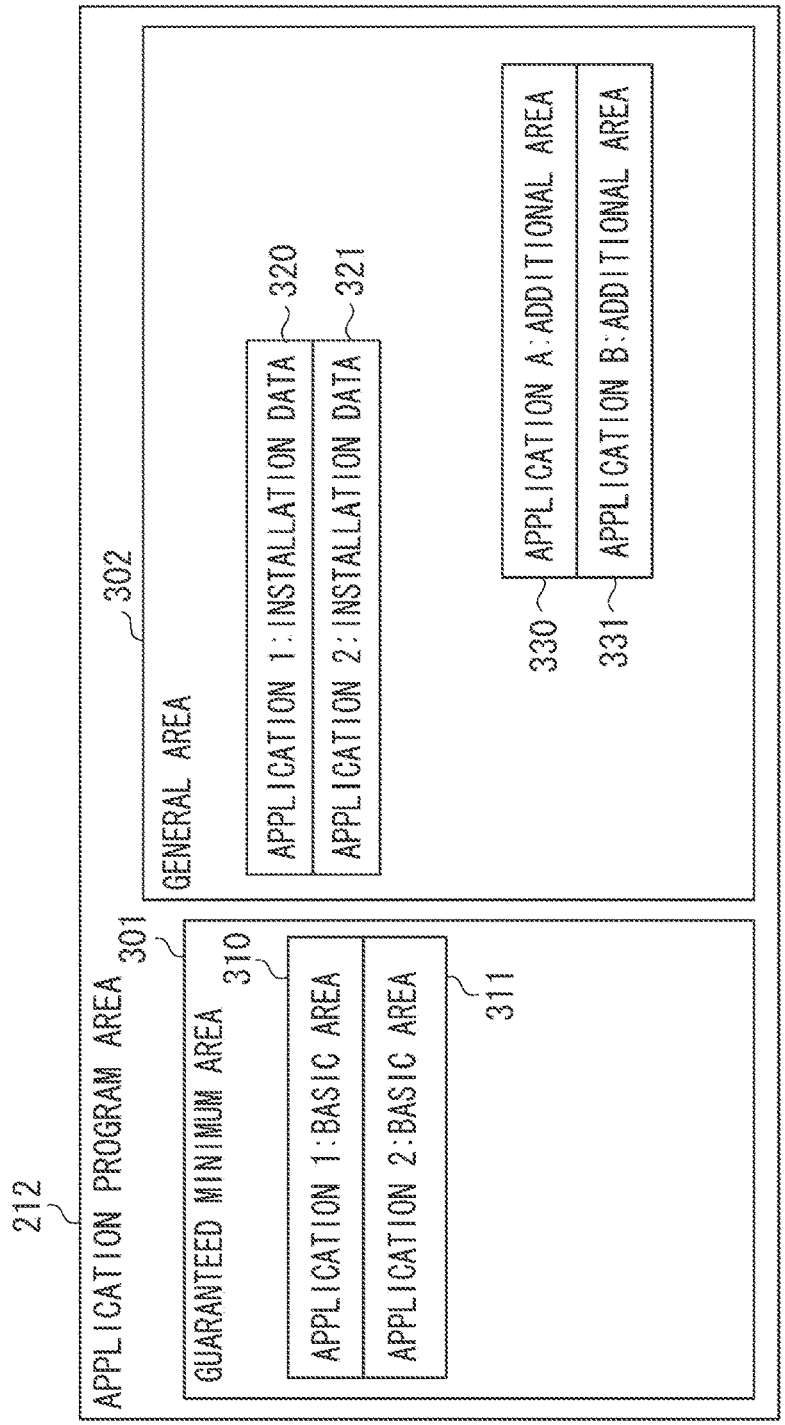
FIG. 3 is a diagram illustrating an example case in which an application program area is divided and the resultant areas are managed.

Such a state is illustrated in FIG. 3.

In the present exemplary embodiment, the CPU 101 divides the application program area 212 into two areas of a guaranteed minimum area 301 and a general area 302, and manages these two areas.

For example, if the application program area 212 has a size of 100 MBytes, the CPU 101 divides the application program area 212 into the guaranteed minimum area 301 having a size of 30 MBytes and the general area 302 having a size of 70 MBytes and manages these two areas. Such an example case is used to describe the state illustrated in FIG. 3.

In this application program operation environment, assume that the number of applications that can be installed is a maximum of ten. In this case, since the guaranteed minimum area 301 has a size of 30 MBytes, the CPU 101 controls the guaranteed minimum area 301 such that 3 MBytes are provided to each application program from the guaranteed minimum area 301.

A description is given of a case in which the applications A 201 and B 202 are installed in such environment. Since the application body of the application A 201 has a data size of 1 MByte, the CPU 101 acquires 1 MByte from the general area 302 and installs the application A 201 in the general area 302 (installation data 320). At the same time, the CPU 101 allocates 3 MBytes (a basic area 310) as an area dedicated to the application A 201 from the guaranteed minimum area 301. The basic area 310 can be freely used by the application A 201. Since a size of login data to be dealt with by the application A 201 is 0.5 MByte per record, the login application of the application A 201 can retain and use at least six records of data. If a seventh or later address data is intended to be created, the CPU 101 acquires storage (an additional area 330) from the general area 302 and then operates the application A 201.

Similarly, since an application body of the application B 202 has a data size of 2 MBytes, the CPU 101 acquires 2 MBytes from the general area 302 and installs the application B 202 in the general area 302 (installation data 321). At the same time, the CPU 101 allocates 3 MBytes (a basic area 311) as an area dedicated to the application B 202 from the guaranteed minimum area 301. The basic area 311 can be freely used by the application B 202. Since a size of image data to be dealt with by the application B 202 is 3 MBytes per record, the form print application of the application B 202 can retain and use at least one record of data. If a second or later address data is intended to be created, the CPU 101 acquires storage (an additional area 331) from the general area 302 and then operates the application B 202.

Accordingly, the CPU 101 allocates dedicated areas to respective applications. The dedicated areas are allocated as areas having the same size as each other and allowing the applications to be at least operated. If an application needs more storage than the dedicated area, the CPU 101 acquires the storage from the general area 302. This enables the application which needs larger storage to be installed and operated.

Figure 4:
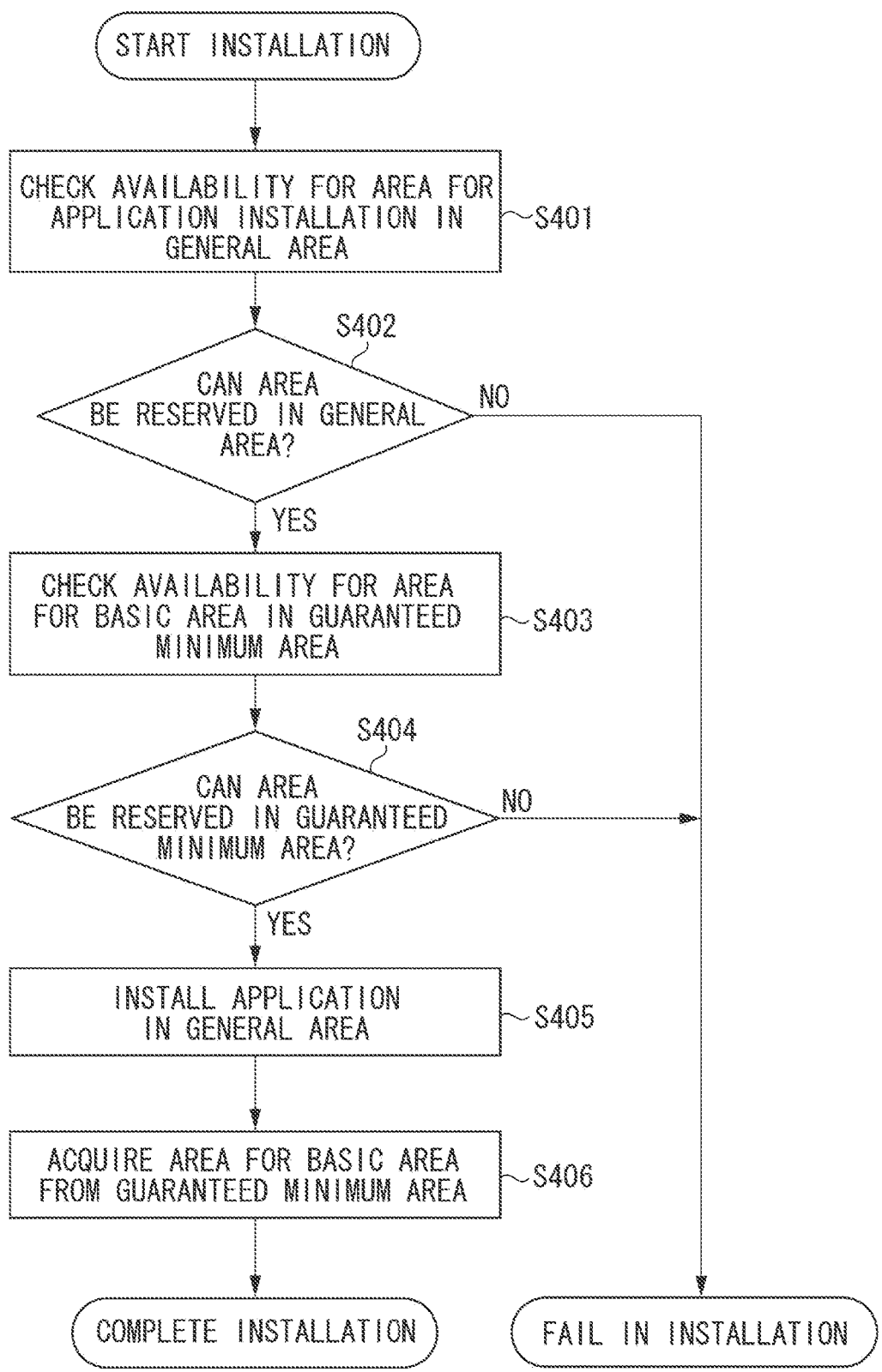
FIG. 4 is a flowchart illustrating an example of information processing performed when an application is installed.

FIG. 4 is a flowchart illustrating an example of information processing performed when an application is installed.

A method for installing an application on the multifunction peripheral 100 includes a method for acquiring data from a compact disk (CD) device or a universal serial bus (USB) memory media, and a method for acquiring data by downloading the data via a network. Installation data is acquired by a method, such as those methods, so that the application is installed on the multifunction peripheral 100. However, in the present exemplary embodiment, the installation method is not limited thereto. In step S401, when the multifunction peripheral 100 externally acquires data and starts installation of an application, the CPU 101 checks availability of an area that is needed for installation of body data of an application program in the general area 302. In step S402, the CPU 101 determines whether the area for installation of the application can be reserved in the general area 302. If the CPU 101 determines that the area cannot be reserved in the general area 302 (NO in step S402), that is, the general area 302 is already used by other application programs, the CPU 101 determines failure of the installation and the processing ends. If the CPU 101 determines that the area can be reserved in the general area 302 (YES in step S402), the processing proceeds to step S403. In step S403, the CPU 101 checks availability of an area for a basic area in the guaranteed minimum area 301. In step S404, the CPU 101 determines whether the area for the basic area can be reserved in the guaranteed minimum area 301. If the CPU 101 determines that the area cannot be reserved in the guaranteed minimum area 301 (NO in step S404), that is, the number of installed application programs has reached a maximum, the CPU 101 determines failure of the installation and the processing ends. If the CPU 101 determines that the area can be reserved in the guaranteed minimum area 301 (YES in step S404), the processing proceeds to step S405. In step S405, the CPU 101 stores installation data of the application program in the general area 302. Subsequently, in step S406, the CPU 101 acquires storage for the basic area from the guaranteed minimum area 301, and allocates the acquired area as storage dedicated to the application program. Then, the installation processing ends.

Figure 5:
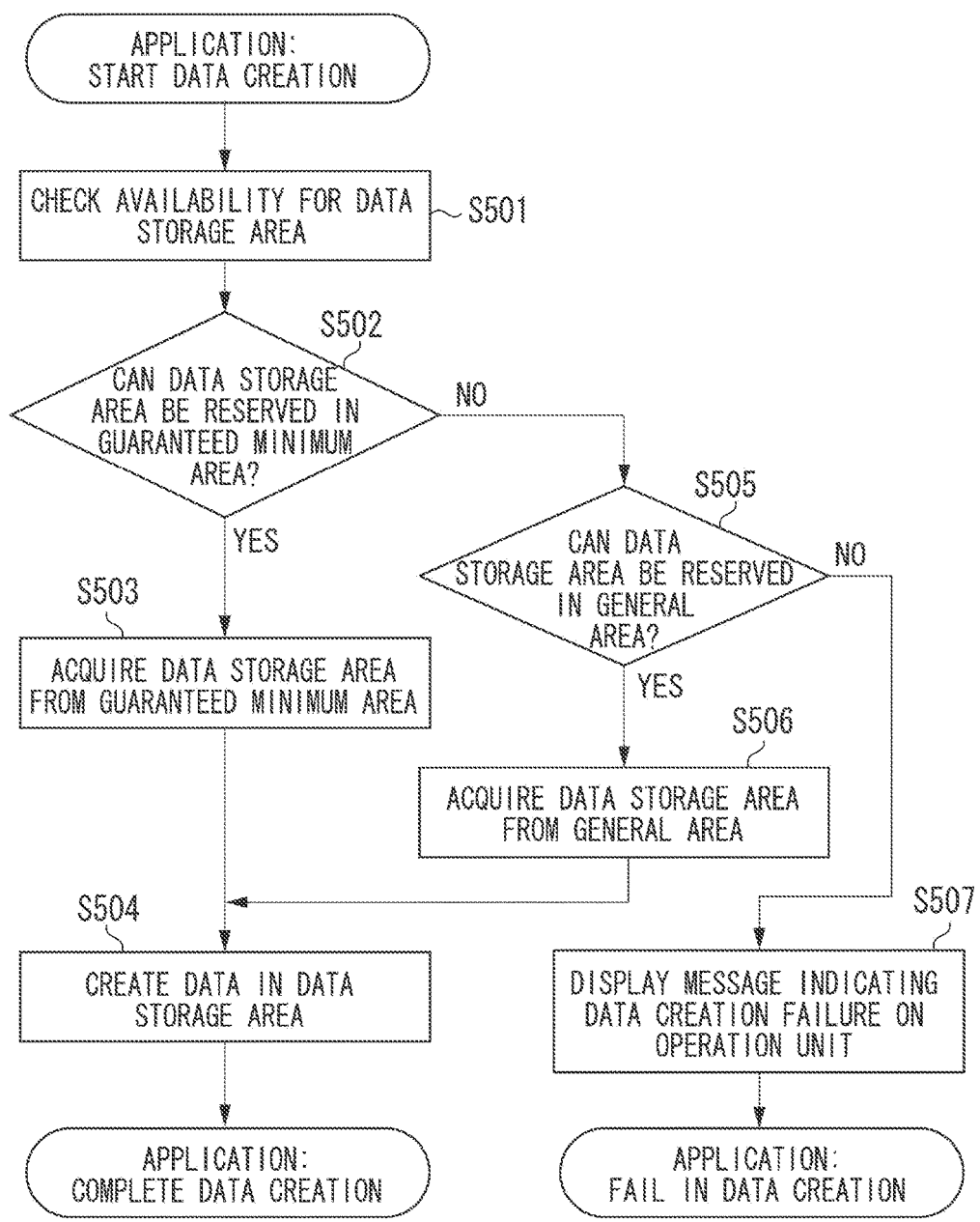
FIG. 5 is a flowchart illustrating an example of information processing performed when an application acquires storage.

Next, a method for acquiring storage for an installed application is described. FIG. 5 is a flowchart illustrating an example of information processing performed when an installed application acquires storage. The flowchart illustrated in FIG. 5 is an example of processing performed when a general application needs storage at the time of operation, and a type of the application is not considered. In this example, the above-mentioned application A 201 is used to describe an example of information processing that is performed when a data area for login is reserved at the time of a login application operation. The processing illustrated in FIG. 5 is described along with a screen display of the operation unit 104 illustrated in FIGS. 6A through 6C.

Figure 6A:
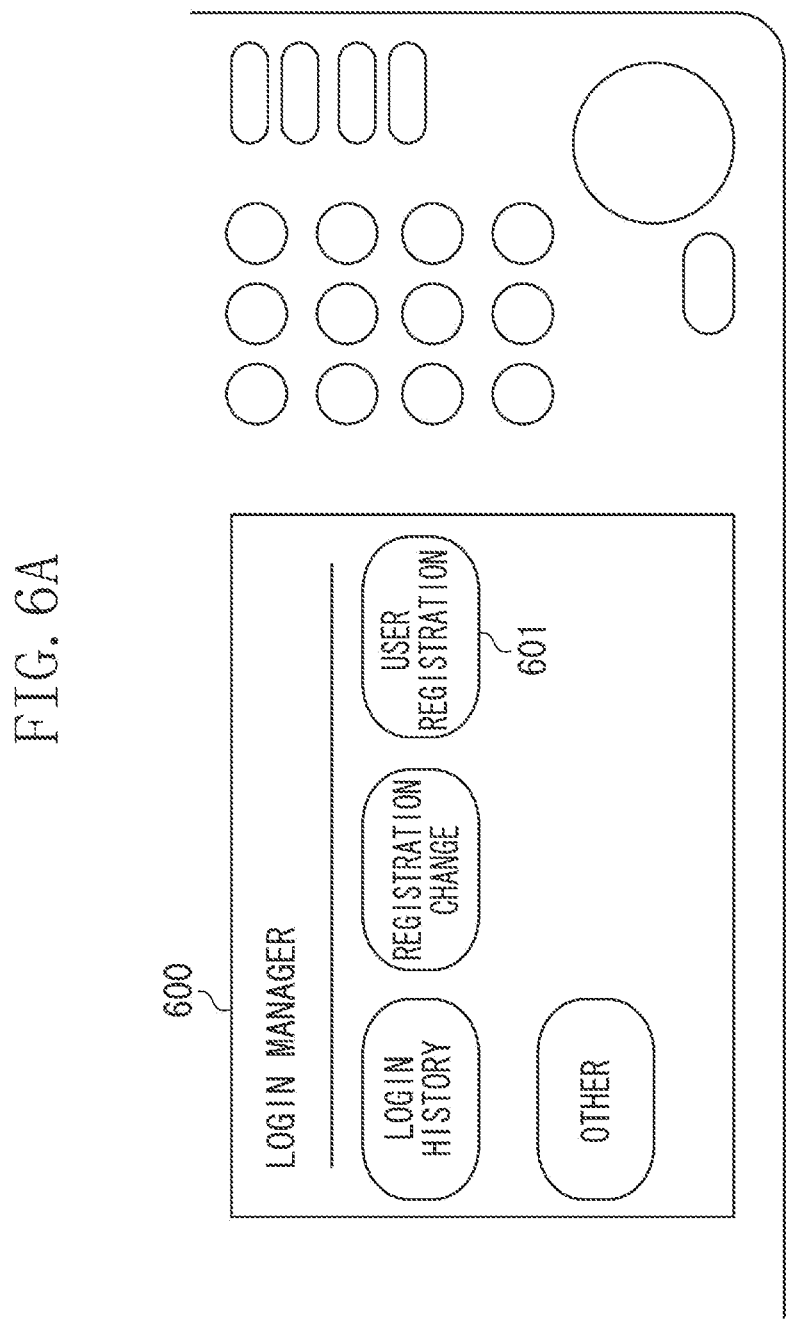

FIG. 6A illustrates a screen 600 displayed as a login application setting menu on the operation unit 104. When a user creates new login data, the user presses a user registration button 601 to instruct the start of the login data creation. A storage area for the login data then becomes necessary. In step S501, the CPU checks availability of the login data storage in the application program area 212. In step S502, the CPU 101 determines whether the login data storage area can be reserved as an area which may have a predetermined size (e.g. 310 or 311 in FIG. 3) in the guaranteed minimum area 301 allocated to the application A 201. If the CPU 101 determines that the login data storage area can be reserved in the guaranteed minimum area 301 (YES in step S502), the processing proceeds to step S503. In step S503, the CPU acquires the login data storage area from the guaranteed minimum area 301. The CPU may reserve the area which may have a predetermined size (e.g. 310 or 311 in FIG. 3) in S503. In such a case, a display of the operation unit 104 is shifted to a user registration data input screen, for example, a screen 610 illustrated in FIG. 6B, so that the user inputs registration data in an area 611 on the screen 610. In step S504, when the user presses a user registration button 612, the CPU 101 stores the registered login data in the reserved area. Then, the processing for creating the login data ends. If the CPU 101 determines that the login data storage area cannot be reserved in the guaranteed minimum area 301 (NO in step S502), the processing proceeds to step S505. In step S505, the CPU 101 determines whether the login data storage area can be reserved in the general area 302. If the CPU 101 determines that the login data storage area can be reserved in the general area 302 (YES in step S505), the processing proceeds to step S506. In step S506, the CPU 101 acquires the login data storage area from the general area 302. In such a case, a display of the operation unit 104 also is shifted to a user registration data input screen such as the screen 610 illustrated in FIG. 6B, so that the user inputs the registration data into the area 611 on the screen 610. In step S504, when the user presses the user registration button 612, the CPU 101 stores the registered login data in the reserved area. Then, the processing for creating the login data ends. If the CPU 101 determines that the login data storage area cannot be reserved even in the general area 302 (NO in step S505), it means that there is no available area, and thus the CPU 101 executes the following processing. That is, in step S507, the CPU 101 displays a message indicating failure of the login data creation due to the absence of unused space in the memory on a screen 620 illustrated in FIG. 6C in the operation unit 104. Accordingly, when the login data creation fails, the processing ends. The CPU 101 can change the processing in step S507 according to the application.

According to the present exemplary embodiment, when the multifunction peripheral 100 including the ROM (eMMC) 102 having small capacity simultaneously operates a plurality of applications, the multifunction peripheral 100 manages the plurality of applications such that a maximum storage size that is needed for each of the applications is not used. The multifunction peripheral 100 divides an area of the ROM (eMMC) 102 allocated for applications into two areas, namely the guaranteed minimum area 301 and the general area 302, and provides a certain size of a dedicated area as a basic area to each application. This can guarantee operation of the application. Accordingly, even the multifunction peripheral 100 including the ROM (eMMC) 102 having small capacity can appropriately and concurrently operate a plurality of applications.

Another exemplary embodiment of the present invention is implemented by supplying a program for realizing at least one function of the above-described exemplary embodiment to a system or an apparatus via a network or a storage medium. The present exemplary embodiment can also be realized by performing processing in which a program is read by at least one processor in a computer disposed in the system or the apparatus. Moreover, the present exemplary embodiment can be realized by a circuit (e.g., application specific integrated circuit (ASIC)) that has one or more functions.

The present invention has been described above with reference to exemplary embodiments. However, the present invention is not limited to the details of the specific embodiments described above.

According to processing of each of the above exemplary embodiments, even if the multifunction peripheral 100 has a small storage area, the multifunction peripheral 100 can simultaneously operate a plurality of applications.

According to the present exemplary embodiment, even if an information processing apparatus has a small storage area, the information processing apparatus can simultaneously operate a plurality of applications.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-195835, filed Oct. 1, 2015, which is hereby incorporated by reference herein in its entirety.

What is claimed is:

1. An information processing apparatus including a storage area, the information processing apparatus comprising:
an installation unit configured to install an application in the storage area;
an allocation unit configured to allocate, in a first area of an application program area in the storage area, an area having a predetermined size to the application which is installed by the installation unit;
a reserving unit configured to determine whether a processing area to be used when processing of the application is executed is able to be reserved in the first area allocated to the application in the storage area, and upon condition that the processing area is able to be reserved in the first area, to reserve the processing area in the allocated area to the application in the first area, and upon condition that the processing area is not able to be reserved in the first area, try to reserve the processing area in a second area of the application program area; and
a notification unit configured to perform notification upon condition that the processing area is not able to be reserved in the second area,
wherein an amount of memory allocated to one application in the first area being based on the maximum number of applications that can be installed, whereas an amount of memory available to be used by one application in the second area is not fixed, and the amount of memory available to be used by the one application in the second area varies depending on usage by other application stored in the second area, and
wherein the allocation unit, the reserving unit and the notification unit are implemented by at least one processor executing instructions stored in a memory.

2. The information processing apparatus according to claim 1, wherein the allocation unit allocates areas for storing installation data of each of the plurality of applications in the second area.

3. The information processing apparatus according to claim 1,
wherein upon condition that the processing area is not able to be reserved in the first area, the reserving unit determines whether the processing area is able to be reserved in the second area, and
wherein upon condition that the processing area is able to be reserved in the second area, the reserving unit reserves the processing area in the second area, and upon condition that the processing area is not able to be reserved in the second area, the reserving unit executes processing according to the application.

4. The information processing apparatus according to claim 3,
wherein the reserving unit displays, upon condition that the application is a login application and the processing area is not able to be reserved in the second area, a message indicating that login data creation has failed due to an insufficient memory area.

5. The information processing apparatus according to claim 1, wherein the information processing apparatus is a multifunction peripheral, and the application is an embedded application that operates on the multifunction peripheral.

6. An information processing method to be executed by a processor executing instructions in a memory, the information processing method comprising:
installing an application in the storage area;
allocating, in a first area of an application program area in the storage area, an area having a predetermined size to the application when the application is installed;
determining whether a processing area to be used when processing of the application is executed is able to be reserved in the first area allocated to the application in the storage area, and upon condition that it is determined that the processing area is able to be reserved in the first area, reserving the processing area in the allocated area to the application in the first area, and upon condition that it is determined that the processing area is not able to be reserved in the first area, trying to reserve the processing area in a second area of the application program area; and
performing notification upon condition that the processing area is not able to be reserved in the second area,
wherein an amount of memory allocated to one application in the first area being based on the maximum number of applications that can be installed, whereas an amount of memory available to be used by one application in the second area is not fixed, and the amount of memory available to be used by the one application in the second area varies depending on usage by other application stored in the second area.

7. A non-transitory storage medium storing a control program for causing a processor to execute an information processing method, the information processing method comprising:
installing an application in the storage area;
allocating, in a first area of an application program area in the storage area, an area having a predetermined size to the application when the application is installed;
determining whether a processing area to be used when processing of the application is executed is able to be reserved in the first area allocated to the application in the storage area, and upon condition that it is determined that the processing area is able to be reserved in the allocated area to the application in the first area, reserving the processing area in the first area, and upon condition that it is determined that the processing area is not able to be reserved in the first area, trying to reserve the processing area in a second area of the application program area; and
performing notification upon condition that the processing area is not able to be reserved in the second area,
wherein an amount of memory allocated to one application in the first area being based on the maximum number of applications that can be installed, whereas an amount of memory available to be used by one application in the second area is not fixed, and the amount of memory available to be used by the one application in the second area varies depending on usage by other application stored in the second area.

* * * * *